United States Patent Office 2,794,030
Patented May 28, 1957

2,794,030

ALIPHATIC ESTERS OF 4,5-EPOXYCYCLOHEXANE-1,2-DICARBOXYLIC ACIDS

Benjamin Phillips and Paul S. Starcher, Charleston, W. Va., assignors to Union Carbide and Carbon Corporation, a corporation of New York No Drawing. Application October 18, 1955,
Serial No. 541,296

6 Claims. (Cl. 260—348)

This invention relates to a novel class of organic epoxides and has for an object the provision of new types of organic epoxides suitable for use as plasticizers and stabilizers for vinyl halide resins. More particularly, this invention is directed to aliphatic hydrocarbon esters of 4,5-epoxycyclohexane-1,2-dicarboxylic acids. The class of compounds to which this invention is directed can be represented by the following general formula:

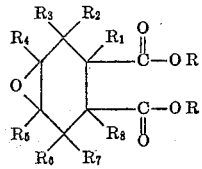

wherein R represents aliphatic hydrocarbon radicals containing from one to eighteen carbon atoms and free from acetylenic unsaturation. More particularly, a preferred class of epoxides are those wherein R represents an aliphatic hydrocarbon radical, such as, for example, methyl, vinyl, ethyl, allyl, propyl, isopropyl, butyl, 2-butenyl, isobutyl, tertiary butyl, amyl, 2-hexenyl, hexyl, heptyl, octyl, 2-octenyl, 2-ethylhexyl, nonyl, decyl, dodecyl, tridecyl, octadecyl and the like. A particularly preferred class of epoxides are those in which $R_1$ through $R_8$ represent lower alkyl groups and R is as above defined. A still more particularly preferred class of epoxides are those in which when $R_1$ through $R_8$ represent lower alkyl groups, the total number of carbon atoms in $R_1$ through $R_8$ does not exceed twelve. As pointed out hereinbefore, the epoxides of this invention are useful as plasticizers and stabilizers for vinyl halide polymers. Additionally, the plasticizing and stabilizing characteristics of the compounds of this invention are common to the group when R represents an aliphatic hydrocarbon radical containing from one through eighteen carbon atoms and $R_1$ through $R_8$ are as above defined. Also, the compounds of this invention are useful as modifiers for commercially important synthetic condensation resins and as intermediates in the preparation of a large number of chemical compounds.

It has also been discovered that certain of the compounds within the scope of this invention possess outstanding characteristics which make them admirably suitable for use as fungus resistant plasticizers for vinyl chloride polymers. These compounds are the dialkyl esters of 4,5-epoxycyclohexane-1,2-dicarboxylic acids containing from eight through thirteen carbon atoms in the alkyl groups which correspond to the general formula:

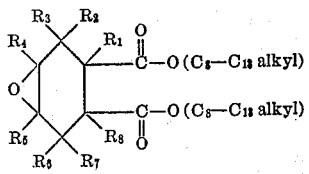

wherein $R_1$ through $R_8$ represent members selected from the group consisting of hydrogen and lower alkyl groups and wherein the total number of carbon atoms in $R_1$ through $R_8$ does not exceed twelve. Additionally, it has also been discovered that these compounds are particularly adapted for use in the manufacture of 60° and 80° wire cable.

The compounds of this invention are prepared by the reaction of a Diels-Alder reaction product, comprising a diolefin and an anhydride, and peracetic acid, or acetaldehyde monoperacetate. Starting materials which are useful in preparing the epoxides of this invention are readily obtainable by the Diels-Alder adduct of an olefinic anhydride ester and a diolefinic aliphatic hydrocarbon to form a 4-cyclohexene-1,2-dicarboxylic anhydride or ester. Among the many compounds suitable as starting materials to produce epoxides of the class described are compounds such as the dialkyl esters of 3-methyl-4-cyclohexene-1,2-dicarboxylic acid; 4-methyl-4-cyclohexene-1,2-dicarboxylic acid; 3-ethyl-4-cyclohexene-1,2-dicarboxylic acid; 3,5- and 4,5-dimethyl-4-cyclohexene-1,2-dicarboxylic acid; 3-ethyl-6-methyl-4-cyclohexene-1,2-dicarboxylic acid; 3-isopropyl-4-cyclohexene-1,2-dicarboxylic acid; 1,2-dimethyl-4-cyclohexene-1,2-dicarboxylic acid; 4-amyl-4-cyclohexene-1,2-dicarboxylic acid and 2,3-dimethyl-4-cyclohexene-1,2-dicarboxylic acid. As may be readily observed, the final epoxidized product can contain one or more alkyl groups of the same or varying chain lengths merely by proper selection of starting materials. The fact that the epoxides can have one or more alkyl substituents does not in any substantial way alter the epoxide compounds for use in the manners above described and does in some instances enhance the physical properties of resin compositions containing the same. Furthermore, the epoxide compounds of this invention can be produced with one or more alkyl groups at any of the designated ring positions without suffering deleterious effects attributable to such chemical phenomena as steric hindrance and the like.

As referred to hereinbefore, the epoxides of this invention are readily prepared by the epoxidation of the olefinic linkage contained in the starting material, such as, for example, in the case of diethyl tetrahydrophthalate and peracetic acid the product would be diethyl 3,4-epoxycyclohexane-1,2-dicarboxylate. The epoxides are readily prepared by either of two oxidation methods both of which are efficacious and provide commercially acceptable yields.

The first oxidation method is called the acetaldehyde monoperacetate method and the reaction whereby the epoxides are formed may be illustrated by the following general equation:

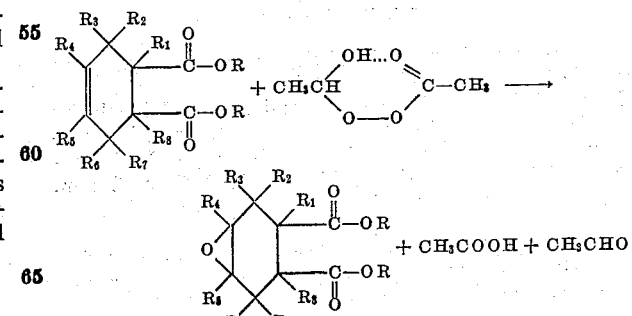

wherein R and $R_1$ through $R_8$ represent groups as above defined.

The second oxidation method is called the peracetic acid method and the reaction whereby the epoxides are formed by this method may be illustrated by the following general equation:

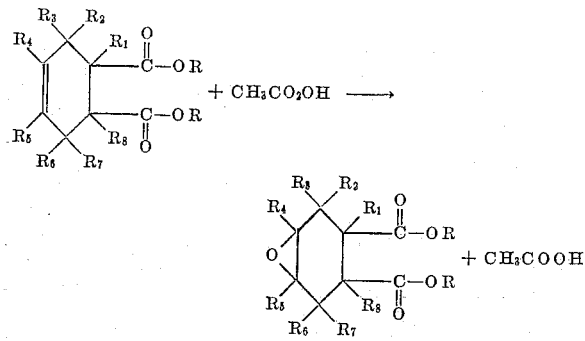

wherein R and $R_1$ through $R_8$ represent groups as above defined.

The following examples will serve to illustrate the practice of the invention:

EXAMPLE 1

*Preparation of diethyl 4,5-epoxycyclohexane-1,2-dicarboxylate*

A quantity of 1071 grams of diethyl 4-cyclohexene-1,2-dicarboxylate was placed in a four-necked, five-liter flask equipped with a stirrer, reflux condenser, dropping funnel, and thermometer. At 40° C., addition of a 26.4 percent peracetic acid solution in acetone was begun. After three hours, all of the required 1738 grams of peracetic acid solution had been added. After two additional hours of heating at 40° C., the conversion based on the consumption of peracetic acid was determined and found to be 98 percent. The reaction mixture was then fed slowly into a still kettle containing refluxing ethylbenzene under reduced pressure. The unspent peracetic acid, acetone, acetic acid, and some ethylbenzene were removed continuously from the top of a fractionating column attached to the kettle. Under these conditions, acetic acid and ethylbenzene are last removed as a constant boiling mixture.

When all of the acetic acid, ethylbenzene, acetone, and peracetic acid had been removed, the kettle material was recharged to a still equipped with a distillation column and distilled under reduced pressure. After removal of a small forerun, 1049 grams of diethyl 4,5-epoxycyclohexane-1,2-dicarboxylate were obtained by distillation at 1.2 mm. of Hg pressure (B. P.=127° C.–129° C. at 1.2 mm. of Hg pressure; $n_D^{30}$=1.4604). An analysis for the epoxide groups present showed that the product had a purity of 98.29 percent. The yield was 93.9 percent of the theoretical, and the efficiency based on residue formation was 93.0 percent.

EXAMPLE 2

*Preparation of dibutyl 1-methyl-4,5-epoxycyclohexane-1,2-dicarboxylate*

A mixture of two mols of citraconic anhydride, three mols of butadiene, 200 cc. of toluene and three grams of hydroquinone was heated in a stainless steel bomb for 16.5 hours at 100° C. Distillation of the reaction mixture gave a 78 percent yield of 1-methyl-1,2,3,6-tetrahydrophthalic anhydride boiling at 112° C. at 2 mm. of Hg pressure and having a refractive index of 1.4838 ($n_D^{30}$).

A mixture of 0.5 mol of 1-methyl-1,2,3,6-tetrahydrophthalic anhydride, 4 mols of n-butanol, and 1 gram of sulfuric acid was heated under reflux for 6.5 hours during which time the theoretical amount of water was removed. The catalyst was neutralized and the product distilled. An 87 percent yield of dibutyl 1-methyl-1,2,3,6-tetrahydrophthalate, having a boiling point of 135° C. at 1 mm. of Hg pressure and a refractive index of 1.4580 ($n_D^{30}$), was obtained.

Over a period of one hour, a solution of peracetic acid (0.45 mol) in acetone was added to 0.3 mol of dibutyl 1-methyl-1,2,3,6-tetrahydrophthalate at 40° C. After an additional reaction period of 5.5 hours at 40° C., the reaction mixture was added to 500 grams of ethylbenzene and distilled under reduced pressure. The corresponding epoxide was obtained in approximately 70 percent yield. This epoxide, dibutyl 1-methyl-4,5-epoxycyclohexane-1,2-dicarboxylate, was a colorless liquid boiling at 161° C. at 2.5 mm. of Hg pressure and having a refractive index of 1.4601 ($n_D^{30}$). The purity, as determined by an analysis for epoxide groups by the pyridine hydrochloride method, was 95 percent.

EXAMPLE 3

*Preparation of dibutyl 4-methyl-4,5-epoxycyclohexane-1,2-dicarboxylate*

A mixture of 1.085 mols of 4-methyl-4-cyclohexene-1,2-dicarboxylic acid, 4.34 mols of n-butanol, and 2.6 grams of p-toluenesulfonic acid was heated in a kettle under reflux at atmospheric pressure and water was removed as it was formed. When no more water distilled over and a titration of the kettle indicated that the reaction was complete, the catalyst was neutralized with sodium acetate and the mixture was distilled under reduced pressure. There was obtained a 90 percent yield of dibutyl 4-methyl-4-cyclohexene-1,2-dicarboxylate, a colorless liquid boiling at 143° C. at 2 mm. of Hg pressure and having a refractive index of 1.4600 ($n_D^{30}$).

To 0.675 mol of the above ester was added a solution of peracetic acid (1.01 mol) in acetone at 25° C.–28° C. over a period of 1.75 hours. After an additional 1.75 hour reaction period, the reaction mixture was added to ethylbenzene and distilled under reduced pressure. The product, dibutyl 4-methyl-4,5-epoxycyclohexane-1,2-dicarboxylate, was a colorless liquid boiling at 168° C. at 2.5 mm. of Hg pressure and had a refractive index of 1.4565 ($n_D^{30}$).

EXAMPLE 4

*Preparation of di-(2-ethylhexyl)-4,5-epoxycyclohexane-1,2-dicarboxylate*

One hundred twenty-eight pounds of di-(2-ethylhexyl) 4-cyclohexene-1,2-dicarboxylate were charged to a 50-gallon stainless-steel still kettle equipped with an agitator and a 20-plate bubble cap column. The ester was heated to 40° C. and 160 pounds of a 23 percent solution of peracetic acid in acetone were added with agitation over a period of 5 hours. The reaction was exothermic and cooling was required during the addition. After the addition was complete, the reaction mixture was held at a temperature of about 40° C. and agitated for an additional 8 hours. An analysis for peracetic acid indicated that all of the peracetic acid had been used.

The reaction mixture in the kettle was cooled and removed to a stainless-steel drum and the still was charged with 270 pounds of ethylbenzene and heated under reflux at 60 mm. of Hg pressure. The reaction mixture in the drum was fed over a period of 8 hours into the kettle of refluxing ethylbenzene. A distillate consisting of acetone, acetic acid, peracetic acid and ethylbenzene was removed at the rate of 30 to 50 pounds per hour. At the conclusion of the feeding period, the residue product was stripped of excess ethylbenzene to a kettle temperature of 100° C. at a pressure of 4 mm. of Hg. There remained 147.5 pounds of a pale yellow residue product which analyzed 91.8 percent as di-(2-ethylhexyl) 4,5-epoxycyclohexane-1,2-dicarboxylate. Distillation of a portion of the residue product on a one-plate column gave a colorless product having a boiling point of approximately 230° C. at 3.5 mm. of Hg pressure, a refractive index of 1.4637 ($n_D^{30}$), and a purity of 96 percent, as judged by an analysis for epoxide groups.

Various other esters, such as, for example, the propyl, isopropyl, amyl, and hexyl esters, may be readily obtained by the substitution of the desired alcohol in the above example, since there is no substantial difference in the manipulative procedure involved in their production. If desired, mixed esters may also be produced.

EXAMPLE 5

*Preparation of dimethyl 4,5-epoxychlorhexane-1,2-dicarboxylate*

A solution of 1.89 mols of peracetic acid in acetone (22.4 percent) was added over a period of 1.75 hours to 1.51 mols of dimethyl 1,2,3,6-tetrahydrophthalate. The temperature was maintained at 40° C. by cooling with an ice bath when necessary. The reaction was continued for an additional 3.5 hours, at which time an analysis for peracetic acid indicated that 96.6 percent of the theoretical amount had been consumed. The reaction mixture was then fed, over a period of 3 hours, into a still kettle containing 700 grams of ethylbenzene under reflux at a kettle temperature of 65° C., and a distillate consisting of acetone, acetic acid, peracetic acid and ethylbenzene was removed continuously at the stillhead. Fractionation of the kettle material resulted in an 81 percent yield of dimethyl 4,5-epoxycyclohexane-1,2-dicarboxylate, a colorless liquid having a boiling point range of 138° C. to 140° C. at 3.0 mm. of Hg pressure and a refractive index range of 1.4690 to 1.4741 ($n_D^{30}$). The product is a mixture of isomers since the purity, as judged by an epoxide analysis by the pyridine hydrochloride method, was 96 percent or greater on all cuts.

EXAMPLE 6

*Preparation of bis-(decyl) 1,2,3,6-tetrahydrophthalate*

Tetrahydrophthalic anhydride (152 grams, 1.0 mol) and a mixture of "oxo" decanols prepared by the reaction of tripropylene and carbon monoxide through the "oxo" reaction (380 grams, 2.4 mols) and 1 cc. of an alkanesulfonic acid were heated together under reflux in a toluene solution and the evolved water was removed from the system. The reaction time was 4 hours at a temperature of 126° C. to 163° C. The reaction product was neutralized, washed with water and stripped in a goose-neck still at a temperature of 181° C. at 3.0 mm. of Hg pressure. The residue product, consisting of 336 grams, had the following physical properties:

| | |
|---|---|
| Color | yellow liquid. |
| Acidity | nil. |
| Ester | 99.2 percent. |
| Refractive index $n_D^{30}$ | 1.4638. |
| Density $D_{20}^{20}$ | 0.9495. |

EXAMPLE 7

*Preparation of bis-(decyl) 4,5-epoxycyclohexane-1,2-dicarboxylate*

A solution of 0.88 mol of peracetic acid in acetone (22 percent) was added over a period of 1 hour to 0.70 mol of bis-(decyl) 1,2,3,6-tetrahydrophthalate while maintaining the reaction temperature of 40° C. After an additional 7.25 hours, an analysis for peracetic acid indicated that 97.4 percent of the theoretical amount had been consumed. Thereupon, the reaction mixture was fed, over a period of 1.5 hours, into a still kettle containing 500 grams of ethylbenzene under reflux at a kettle temperature of 65° C., and a distillate consisting of acetone, acetic acid, peracetic acid and ethylbenzene was removed continuously at the stillhead. At the conclusion of the feeding period, the residue product was stripped free of ethylbenzene to a kettle temperature at 105° C. at a pressure of 3 mm. of Hg. An analysis for epoxide groups by the pyridine hydrochloride method indicated that 92.5 percent of the double bonds had been epoxidized. The residue product had a Gardner (1933) color of 1 and an iodine number of 1.5.

EXAMPLE 8

*Preparation of bis-(tridecyl) 1,2,3,6-tetrahydrophthalate*

Tetrahydrophthalic anhydride (152 grams, 1 mol), a mixture of "oxo" tridecanols prepared by the reaction of tetrapropylene and carbon monoxide through the "oxo" reaction (480 grams, 2.25 mols) and 1 cc. of an alkanesulfonic acid catalyst were heated together under reflux in a toluene solution and the evolved water was removed from the system. The residue product had the following physical properties:

| | |
|---|---|
| Physical state | liquid. |
| Color, Gardner (1933) | 5. |
| Acidity | Nil. |
| Ester | 97.5 percent. |
| Refractive index, $n_D^{30}$ | 1.467. |
| Density, $D_{20}^{20}$ | 0.9372. |

EXAMPLE 9

*Preparation of bis-(tridecyl) 4,5-epoxycyclohexane-1,2-dicarboxylate*

A solution of 1.02 mols of peracetic acid in acetone (22 percent) was added over a period of 1 hour to 0.81 mol of bis-(tridecyl) 1,2,3,6-tetrahydrophthalate while the temperature was maintained at 40° C. After an additional 7.5-hour reaction period, an analysis for peracetic acid indicated that 98.8 percent of the theoretical amount of peracetic acid had been consumed. Thereupon, the reaction mixture was fed, over a period of 1.5 hours, to a still kettle containing 500 grams of ethylbenzene under reflux at a kettle temperature of 65° C., and a distillate consisting of acetone, acetic acid, peracetic acid and ethylbenzene was removed at the stillhead. At the conclusion of the feeding period, the residue product was stripped free of ethylbenzene to a kettle temperature of 105° C. at a pressure of 3.0 mm. of Hg. An analysis for epoxide groups by the pyridine hydrochloride method indicated that 91 percent of the double bonds had been epoxidized. The residue product had a Gardner (1933) color of 2 and an iodine number of 1.2.

EXAMPLE 10

*Preparation of di-(2-ethylhexyl) 4,5-epoxy-3(or 4 or 5)-methylcyclohexane-1,2-dicarboxylate*

A mixture of aliphatic $C_5$ dienes from Dripolene, consisting principally of isoprene and piperylene and small amounts of cyclopentadiene was reacted with maleic anhydride to form the corresponding Diels-Alder adducts. The resulting mixture of methyltetrahydrophthalic anhydrides was esterified with 2-ethylhexanol. The excess alcohol was removed under reduced pressure and the residue ester had the following physical properties:

| | |
|---|---|
| Color, Gardner (1933) | 4 |
| Refractive index, $n_D^{30}$ | 1.4638 |
| Density, $D_{20}^{20}$ | 0.9620 |
| Iodine No. | 59.5 |

Six hundred ninety grams of the above ester were charged to a flask and heated to 40° C. Over a 2-hour period, 663 grams of a 24.5 percent solution of peracetic acid in acetone was added while the temperature was maintained at 40° C. After an additional 5.5-hour reaction period, the reaction mixture was diluted with 500 grams of ethylbenzene and stripped free of all volatile materials under reduced pressures. The residue product (710 grams), di-(2-ethylhexyl) 4,5-epoxy-3 (or 4 or 5)-methylcyclohexane-1,2-dicarboxylate, was characterized by the following physical properties:

| | |
|---|---|
| Color, Gardner (1933) | 1 |
| Acidity, as acetic acid | percent 0.23 |
| Iodine No. | 1.83 |
| Epoxide analysis, oxirane oxygen (HBr method) | percent 2.4 |

EXAMPLE 11

*Preparation of didecyl 4,5-epoxy-3 (or 4 or 5)-methylcyclohexane-1,2-dicarboxylate*

The Diels-Alder adduct of a C₅ diene mixture with maleic anhydride and a decyl alcohol, obtained by the "oxo" process from tripropylene, were esterified. The didecyl methyltetrahydrophthalate thus prepared was characterized by the following physical properties:

| | |
|---|---|
| Color, Gardner (1933) | 8 |
| Refractive index, $n_D^{30}$ | 1.4648 |
| Density, $D_{20}^{20}$ | 0.947 |
| Iodine No | 52.3 |

The above ester was epoxidized by adding a solution of 550 grams of a 23.9 percent solution of peracetic acid in acetone dropwise to the ester over a period of 1.25 hours. The temperature was maintained at 40° C. throughout the addition period and for a period of 4.5 hours thereafter. At this time, an analysis for peracetic acid indicated that 96 percent of the theoretical amount of peracetic acid had been consumed. The reaction mixture was then diluted with 500 grams of ethylbenzene and stripped free of volatile material under reduced pressure. The residue product (652 grams), didecyl 4,5-epoxy-3 (or 4 or 5)-methylcyclohexane-1,2-dicarboxylate, was a mobile liquid having the following physical properties:

| | |
|---|---|
| Color, Gardner (1933) | 3 |
| Acidity, as acetic acid _____percent | 0.18 |
| Iodine No | 0.16 |
| Epoxide analysis, oxirane oxygen (HBr method) _____percent | 2.3 |

EXAMPLE 12

*Preparation of diallyl 4,5-epoxycyclohexane-1,2-dicarboxylate*

Five hundred and fifty grams of diallyl tetrahydrophthalate were charged to a flask equipped with stirrer and thermometer. Eight hundred and twenty-five grams of a 25.4 percent solution of peracetic acid in acetone were added dropwise over a period of 2 hours to the stirred ester. The reaction was exothermic, and cooling was required to maintain the temperature of the reaction solutions at 25° C.–30° C. After addition was complete, the reaction conditions were maintained for an additional 4 hours, at which time analysis indicated that all of the peracetic acid had reacted to form the monoepoxide. The reaction solution was fed gradually into a still kettle containing ethylbenzene under reflux at 25 mm. of Hg pressure. The acetone and acetic acid were removed continuously as a distillate. Distillation was continued until all volatile material boiling up to a kettle temperature of 55° C. under 5 mm. of Hg pressure was removed. Analysis of the residue product indicated that 694 grams of diallyl 7-oxabicyclo[4.1.0]heptane-3,4-dicarboxylate were obtained which had a boiling point of 140° C.–153° C. at 2 mm. of Hg pressure and a refractive index of 1.4832–39. Analysis of the product for epoxide content indicated a purity of 95.5 percent.

This application is a continuation-in-part of application Serial No. 374,142, filed August 13, 1953.

What is claimed is:

1. Esters of 4,5 - epoxycyclohexane - 1,2 - dicarboxylic acids characterized by the general formula:

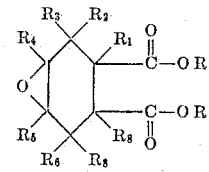

wherein R represents aliphatic hydrocarbon radicals containing from one through eighteen carbon atoms and free from acetylenic unsaturation and R₁ through R₈ represent members selected from the group consisting of hydrogen and lower alkyl groups.

2. Di-(2-ethylhexyl) 4,5-epoxycyclohexane-1,2 - dicarboxylate.

3. Didecyl 4,5-epoxycyclohexane-1,2-dicarboxylate.

4. Di-(tridecyl) 4,5-epoxycyclohexane-1,2 - dicarboxylate.

5. Di-(2-ethylhexyl) 4-methyl-4,5 - epoxycyclohexane-1,2-dicarboxylate.

6. Diallyl 4,5-epoxycyclohexane-1,2-dicarboxylate.

References Cited in the file of this patent

Gill: J. Chem. Soc., 1952: 4630–32.